United States Patent
Yu et al.

(10) Patent No.: US 8,982,736 B2
(45) Date of Patent: Mar. 17, 2015

(54) METHOD FOR IMPLEMENTING RADIOPHONE BASED CONFERENCE CALL AND DYNAMIC GROUPING

(75) Inventors: Yang Yu, Guandong (CN); Hansiong Samuel Chia, Guangdong (CN)

(73) Assignee: Hytera Communications Corp., Ltd., Shenzhen (CN)

( * ) Notice: Subject to any disclaimer, the term of this patent is extended or adjusted under 35 U.S.C. 154(b) by 667 days.

(21) Appl. No.: 12/672,667

(22) PCT Filed: Dec. 12, 2008

(86) PCT No.: PCT/CN2008/073496
§ 371 (c)(1),
(2), (4) Date: Feb. 8, 2010

(87) PCT Pub. No.: WO2010/066086
PCT Pub. Date: Jun. 17, 2010

(65) Prior Publication Data
US 2011/0205939 A1   Aug. 25, 2011

(51) Int. Cl.
*H04L 12/28* (2006.01)
*H04M 1/725* (2006.01)
*H04W 72/00* (2009.01)
*H04W 76/02* (2009.01)

(52) U.S. Cl.
CPC ........ *H04M 1/72519* (2013.01); *H04W 72/005* (2013.01); *H04W 76/021* (2013.01)
USPC ...................................... 370/261; 379/201.01

(58) Field of Classification Search
USPC ............... 370/261, 356; 704/9; 709/227, 203, 709/204; 348/14.08; 455/90.2, 416, 518, 455/41.2
See application file for complete search history.

(56) References Cited

U.S. PATENT DOCUMENTS

2003/0149772 A1* 8/2003 Hsu et al. .................. 709/227
2003/0185371 A1 10/2003 Dobler
(Continued)

FOREIGN PATENT DOCUMENTS

CN   1838703 A   9/2006
CN   1852457 A   10/2006
(Continued)

OTHER PUBLICATIONS

Australian Office Action regarding Application No. 2008365172, dated Jul. 18, 2012.

*Primary Examiner* — Dang Ton
*Assistant Examiner* — Lionel Preval
(74) *Attorney, Agent, or Firm* — Harness, Dickey & Pierce, P.L.C.

(57) ABSTRACT

The present invention provides a method for implementing a radiophone based conference call and dynamic grouping, which generally includes selecting a dynamic grouping function and members of an intended group through a man-machine interface of a radiophone, generating a control packet in a coding format and an extensible interface, the coding format and the extensible interface being inherent to a preset protocol stack module, and then transmitting the control frame in a control frame to a corresponding receiving end, and the receiving end upon reception of the control frame decodes the control frame and initiates a frequency modification module to modify frequency modification information by adding the group ID of the intended group. The radiophone in the present invention can perform a scheduling function, and time can be saved in an emergency for rapid and convenient dealing with an incident.

12 Claims, 16 Drawing Sheets

(56) References Cited

U.S. PATENT DOCUMENTS

| | | | |
|---|---|---|---|
| 2004/0203977 A1* | 10/2004 | Kennedy | 455/518 |
| 2005/0032475 A1* | 2/2005 | Mauney et al. | 455/41.2 |
| 2005/0212908 A1* | 9/2005 | Rodman et al. | 348/14.08 |
| 2007/0150817 A1* | 6/2007 | Ducheneaut et al. | 715/734 |
| 2007/0211705 A1* | 9/2007 | Sunstrum | 370/356 |
| 2007/0255786 A1* | 11/2007 | Mock et al. | 709/204 |
| 2009/0094317 A1* | 4/2009 | Venkitaraman | 709/203 |
| 2009/0176460 A1* | 7/2009 | Mienville et al. | 455/90.2 |
| 2009/0264113 A1* | 10/2009 | Jheng | 455/416 |
| 2010/0100371 A1* | 4/2010 | Yuezhong et al. | 704/9 |

FOREIGN PATENT DOCUMENTS

| | | |
|---|---|---|
| RU | 2005128290 A | 1/2006 |
| RU | 2293368 C2 | 2/2007 |
| WO | 2006/129048 A2 | 12/2006 |

* cited by examiner

A personal computer    A base station    Base stations

Radiophone    Other radiophones

METHOD FOR IMPLEMENTING RADIOPHONE BASED CONFERENCE CALL AND DYNAMIC GROUPING

CROSS-REFERENCE TO RELATED APPLICATIONS

This application is a 371 U.S. National Stage of International Application No. PCT/CN2008/073496, filed Dec. 12, 2008, the disclosures of which are incorporated herein by reference.

FIELD OF THE INVENTION

The present invention relates to the radio communication technology, and in particular to a method for implementing a radiophone based conference call and dynamic grouping.

BACKGROUND OF THE INVENTION

In a traditional private network communication system, a scheduling station present only in a cluster communication system is responsible for functions of scheduling, grouping, calling, listening, etc. The scheduling station also bases its functioning upon a base station and transmits various signals to respective receiving devices through a radio frequency module of the base station with the use of a database inside the base station.

A mobile station remains passive of scheduling and functionality assigning processes, that is, the mobile station is under the control of both the scheduling station and a network management system. In a traditional application, the mobile station is only capable of performing functions of calling, transmitting information, etc. At present, there are generally two types of calls.

One of the two types is a uni-call. In this case, a mobile station calls another mobile station. The communication takes place between the two mobile stations (as illustrated in FIG. 1).

The other type is a group call. In this case, a single mobile station calls a fixed group of predetermined users (as illustrated in FIG. 2).

The group call here is predetermined. The group is specified in two approaches: one is to perform the setting of frequency modification (which refers to modification of a frequency corresponding to a channel for a mobile terminal) on a mobile station (e.g., a radiophone) to define a specific group which the radiophone can call and to define that the radiophone can responds to a call from a user in the group. The other application emerging recently is to perform dynamic grouping in a scheduling station or a network management terminal and to modify the internal setting of the radiophone via an air interface of a base station, which is similar to another frequency modification.

FIG. 3 illustrates a schematic diagram of a traditional scheduling station. As illustrated in FIG. 3, the traditional scheduling station bases its functioning upon a base station. Typically, the scheduling station software is installed in a Personal Computer (PC) which is connected with the base station via a serial interface or an IP network. The scheduling station software transmits a signal through a transmitting and receiving device of the base station to influence another mobile station or base station.

As can be apparent from FIG. 3, because the scheduling station software is installed in the PC, it may be inconvenient to displace the scheduling station which bases its functioning upon the presence of the base station. No scheduling function can be provided for a non-cluster communication system or for respective mobile stations in a direct communication mode.

In other words, it may be very inconvenient for a user to change temporarily the internal setting of a radiophone due to the necessary presence of devices including the scheduling station, a base station, etc.

For example, it is required to call temporarily mobile terminals A, B and D together so that a conference of a small section can be held as in an existing telephone conference function offered through telecommunication (this application approach is defined as a conference call mode). However, the conference call mode is currently available only to wired telephones but has not been involved in mobile communication. Therefore, it is necessary to apply the conference call mode to the mobile communication, particularly to the private network communication.

Moreover, current domestic digital private network systems generally adopting Time Division Multi Access (TDMA) can make efficient use of spectrum resources to thereby offer more extension possibilities for a single mobile terminal.

Traditional radiophones have very limited applications, and existing mobile stations generally still provide only simple communication and short message services. Although some advanced mobile stations can further provide other data services, it is still desired to further develop the extendibility of the mobile stations themselves, for example, to provide a user with specific service functions of a queue-on-busy call, an pre-emption call, identification of communication parties, dynamic regrouping, delayed joining, etc.

Moreover, it will be too late to set up a base station on the spot in an unexpected scenario. For example, a residence community occurring fire is originally provided with around 20 radiophones. In this case, it is not required to set up any base station and the radiophones works in a direction communication mode (i.e., the mobile stations communicates with each other directly without any network infrastructure). The firemen ask for some positional information, etc., presented from the security guards of the residence community, and the ambulance of 120 relieves injured residents. At this time, dealing with the fire will be facilitated significantly if the radiophones of the three sections can be arranged immediately in one group, which would otherwise be out of a support in the conventional art.

Dealing with some traffic accidents or the like may also present a temporary and exigent demand for concerted efforts of different sections, which nevertheless can not be accommodated in the conventional art.

SUMMARY OF THE INVENTION

An object of the invention is to address the disadvantage in the conventional art of performing a scheduling function through a scheduling station. An embodiment of the present invention provides a method for implementing a radiophone based conference call, to perform a conference calling function in radiophones, thereby performing the scheduling function through the radiophones.

Another object of the invention is to address the disadvantage in the conventional art of inconvenience to perform a scheduling function through a scheduling station. An embodiment of the present invention provides a method for implementing a radiophone based dynamic grouping, to perform dynamic grouping of radiophones in a direct communication mode, thereby performing the scheduling function through the radiophones, which would otherwise be performed necessarily by the scheduling station in the conventional art.

According to the technical solution of the present invention to address the technical issues, a method for implementing a radiophone based conference call, wherein when a conference call is required for one or more radiophones, the method includes the steps at a transmitting end of a group:

a. selecting a group ID of an intended group and a group ID of an intended temporary conference call through a man-machine interface of the transmitting end;

b. writing the ID of the transmitting end, the group ID of the intended group and the group ID of the temporary conference call into a preset protocol stack module, and generating a control packet in a coding format and via an extensible interface, the coding format and the extensible interface being inherent to the preset protocol stack module; and c. transmitting the control packet to a corresponding receiving end in a control frame; and the method includes the steps at one or more receiving ends of the intended group:

d. decoding the control frame transmitted from the transmitting end;

e. determining whether the present receiving end is subject to an operation from the control frame, and if it is determined that the present receiving end is subject to an operation from the control frame, going to step e; otherwise, skipping the control frame and ending; and f. initiating a frequency modification module to modify frequency modification information by adding the group ID of the temporary conference call.

After the step c, the method further includes:

retransmitting the control frame to the corresponding receiving end if the transmitting end fails to receive a response returned from the receiving end in a preset period of time; or transmitting the control frame to a next receiving end if the transmitting end receives a response returned from the corresponding receiving end in a preset period of time or if the number of retransmissions exceeds a preset number of retransmissions.

The method further includes:

displaying a condition of setting up the temporary conference call on the man-machine interface of the transmitting end, determining whether all users have been included in the new group of the temporary conference call; and if all users have been included in the new group of the temporary conference call, it indicating a success of setting up the new group among the radiophones; otherwise, transmitting the control frame to a user who has not been included in the new group of the temporary conference call, and returning to the step c.

Before the step e, the method further includes:

determining whether the control frame is a control frame of the temporary conference call, and if the control frame is a control frame of the temporary conference call, going to the step e; otherwise, ending.

After terminating the temporary conference call, the method further includes:

transmitting, by the transmitting end, a teardown data packet to respective members of the intended group to remove the group ID of the temporary conference call from the radiophones participating in the temporary conference call; and tearing down the new group automatically by one of the members if the member fails to receive the teardown data packet and the new group of the temporary conference call keeps inactive for a preset period of time.

The present invention further provides a method for implementing a radiophone based dynamic grouping, wherein when the dynamic grouping is to be performed on one or more radiophones belonging to different groups, the method includes the steps at a transmitting end of the group:

A. selecting a type and a group ID of the intended group and a group ID of a dynamic group through a man-machine interface of the transmitting end;

B. writing the ID of the transmitting end, the group ID of the intended group and the group ID of the dynamic group into a preset protocol stack module, and generating a control packet in a coding format and via an extensible interface, the coding format and the extensible interface being inherent to the preset protocol stack module; and C. transmitting the control packet to a corresponding receiving end in a control frame; and the method includes the steps at one or more receiving ends of the intended group:

D. decoding the control frame transmitted from the transmitting end;

E. determining whether the present receiving end is subject to an operation from the control frame, and if it is determined that the present receiving end is subject to an operation from the control frame, going to the step E; otherwise, skipping the control frame and ending; and F. initiating a frequency modification module to modify frequency modification information by adding the group ID of the dynamic group.

After the step C, the method further includes:

transmitting, by the transmitting end, the control frame periodically to join a subsequent radiophone into the dynamic group.

Before the step E, the method further includes:

determining whether the control frame is a control frame of the dynamic group, and if it is determined that the control frame is a control frame of the dynamic group, going to the step E; otherwise, ending.

After terminating the dynamic grouping, the method further includes:

transmitting, by the transmitting end, a teardown data packet to respective members of the intended group at an interval of a predetermined number of minutes for a preset number of transmissions to remove the group ID of the dynamic group from the radiophones in the dynamic group; or tearing down automatically by one of the radiophones the dynamic group if the radiophone fails to receive the teardown data packet and the dynamic group keeps inactive for a preset period of time.

The method further includes:

setting an identify verification code, and encrypting the control frame.

With the technical solutions of the invention, the invention has the following advantages over the conventional art:

1) The method for implementing a radiophone based call conference according to the present invention may be applied in any mode of private network communication, i.e., the method may be applied in a direct communication mode, a relay mode and a cluster mode, to thereby facilitate both an extended application of private network communication and an increased number of product sale points of a manufacturer for preponderant competitiveness and to save time in an emergency for rapid and convenient dealing with an incident.

2) The method for implementing a radiophone based dynamic grouping according to the present invention may perform a scheduling function variously through mobile stations in a direction communication mode; a user is not required to purchase and use a base station for the scheduling function to thereby realize significant saving of funds; it is convenient and flexible to use and easy to manipulate a mobile station based scheduling system; and time can be saved particularly in an emergency for rapid and convenient dealing with an incident.

DETAILED DESCRIPTION OF THE INVENTION

The present invention is detailed hereinafter with reference to preferred embodiments thereof and the drawings to make the features, aspects and advantages of the present invention more apparent to readers.

Figure 1:
FIG. 1 illustrates a schematic diagram of a uni-call of radiophones in the conventional art.
Figure 2:
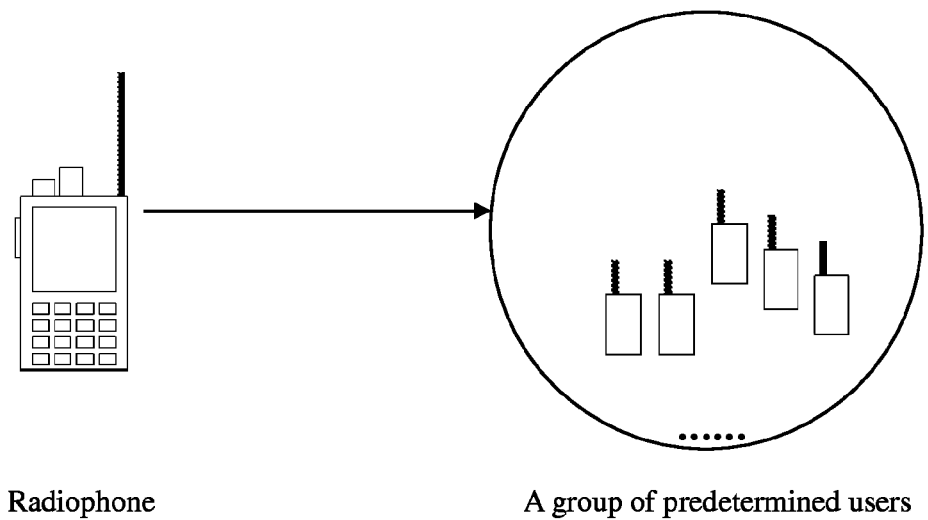
FIG. 2 illustrates a schematic diagram of a group call of radiophones in the conventional art.
Figure 3:
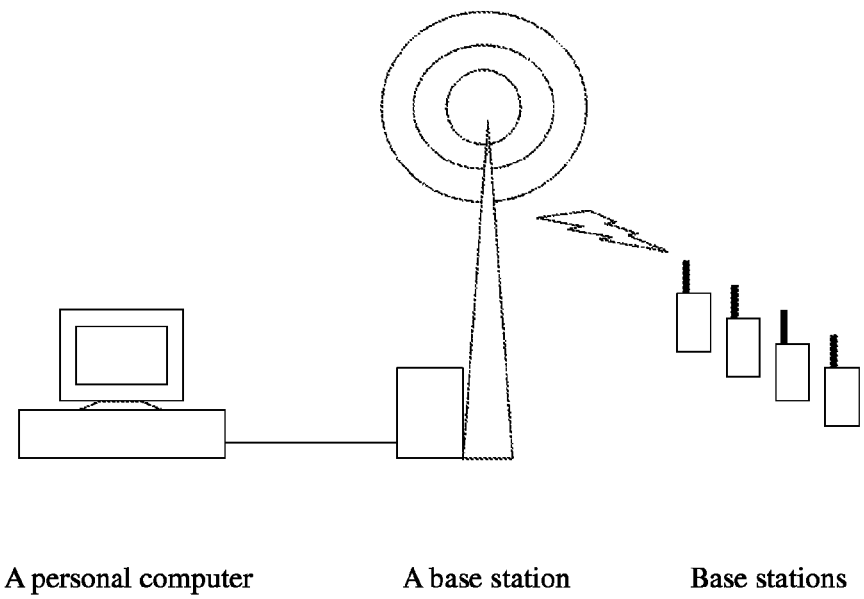
FIG. 3 illustrates a schematic diagram of a traditional scheduling station in the conventional art.
Figure 4:
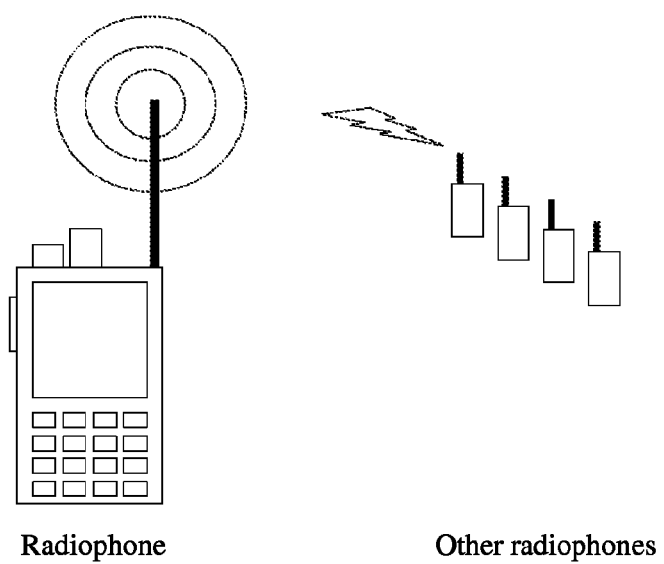
FIG. 4 illustrates a schematic diagram of a radiophone acting as a scheduling station according to the present invention.

In view of the disadvantages in the conventional art of performing a scheduling function through a scheduling station, the present invention provides a method for implementing a radiophone based conference call and dynamic grouping by performing a scheduling function through mobile stations (e.g., radiophones). Operations can be performed through a man-machine interface of a radiophone, and then a radio signal can be transmitted in the air to thereby influence another radiophone. The dynamic grouping refers to setting up of a channel only for a group of users being called, to thereby improve the utilization ratio of the channel while ensuring that a crucial user will not miss any call (as illustrated in FIG. 4).

The method for implementing a radiophone based conference call and dynamic grouping according to the present invention is detailed below with reference to two embodiments.

The First Embodiment

Method for Implementing a Radiophone Based Conference Call

Figure 5:
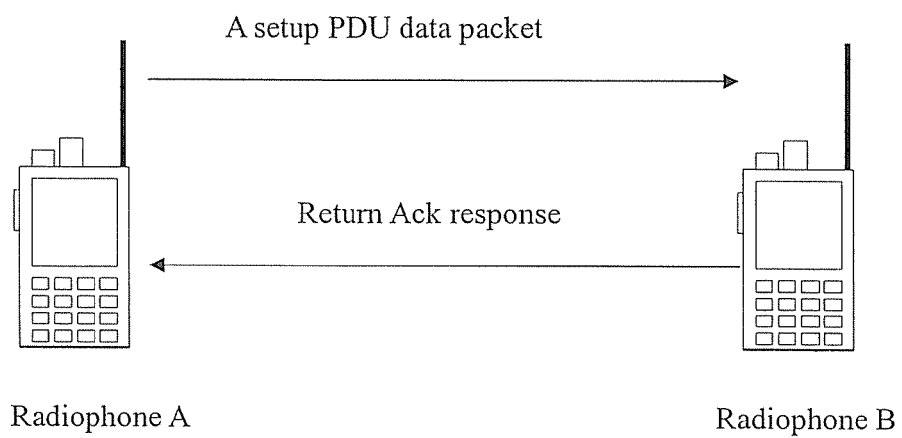
FIG. 5 illustrates a schematic diagram of a method for implementing a radiophone based conference call according to the present invention.

FIG. 5 illustrates a schematic diagram of the method for implementing a radiophone based conference call. As illustrated in FIG. 5, there are a plurality of mobile terminals (or mobile stations) A, B, C, D, E . . . which may be specialized radiophones with specific parameters listed in the Table below:

TABLE 1

| Numbers of Terminals | |
|---|---|
| Label | Address Number |
| A | 101 |
| B | 102 |
| C | 103 |
| D | 104 |
| E | 105 |

Figure 6:
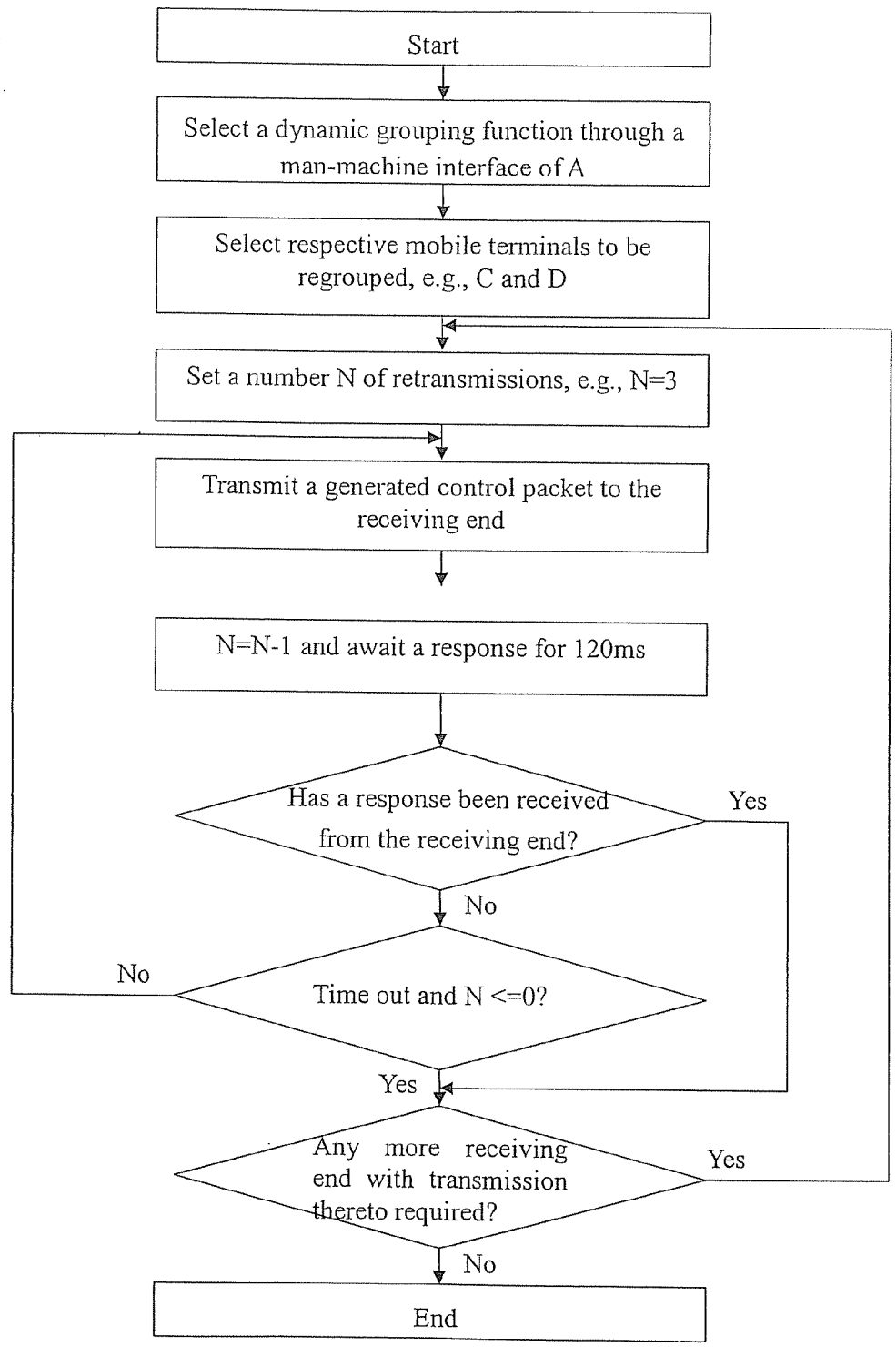
FIG. 6 illustrates a flow chart of operations of implementing a conference call at the transmitting end in FIG. 5.

It is assumed that the mobile terminal A is authorized to group the other mobile terminals. The mobile terminal A groups the mobile terminals C and D into a new group dynamically as follows:

The transmitting end (A) (as illustrated in FIG. 6):

1. Selects a dynamic grouping function through a man-machine interface of the mobile terminal A.

2. Selects IDs of the mobile terminals C and D, for example, by entering the numbers of the mobile terminals C and D directly or by selecting the names of the mobile terminals C and D in a phone book of the mobile terminal A.

3. Selects the ID of a group for which a temporary conference call is required. For example, the ID of a group for which a temporary conference call is required is selected as 10005.

4. Writes the ID of the transmitting end, the group ID of an intended group and the group ID of the temporary conference call into a preset protocol stack module through the man-machine interface of the mobile terminal A, and generates a control packet (PDU) of the conference call in a coding format and via an extensible interface, wherein the coding format and the extensible interface are inherent to the preset protocol stack module.

5. Transmits the generated control packet in a control frame to the mobile terminal C.

6. Awaits a response from the mobile terminal C, and repeats step 5 and step 6 if receiving no response from the mobile terminal C in a preset period of time (e.g., 120 ms or another length of time) until reception of a response from the mobile terminal C or a preset number (e.g., three) of retransmissions.

7. Transmits the generated control packet in a control frame to the mobile terminal D.

8. Awaits a response from the mobile terminal D, and repeats step 7 and step 8 if receiving no response from the mobile terminal D in a preset period of time (e.g., 120 ms or another length of time) until reception of a response from the mobile terminal D or a preset number (e.g., three) of retransmissions.

9. Display the condition of setting up the conference call, including whether respective users have been included in the group, on the man-machine interface of the mobile terminal A.

10. A new group including the mobile terminals C and D has been set up successfully among the mobile terminals, and now a group call can be performed as in a normal case of using a group.

Figure 7:
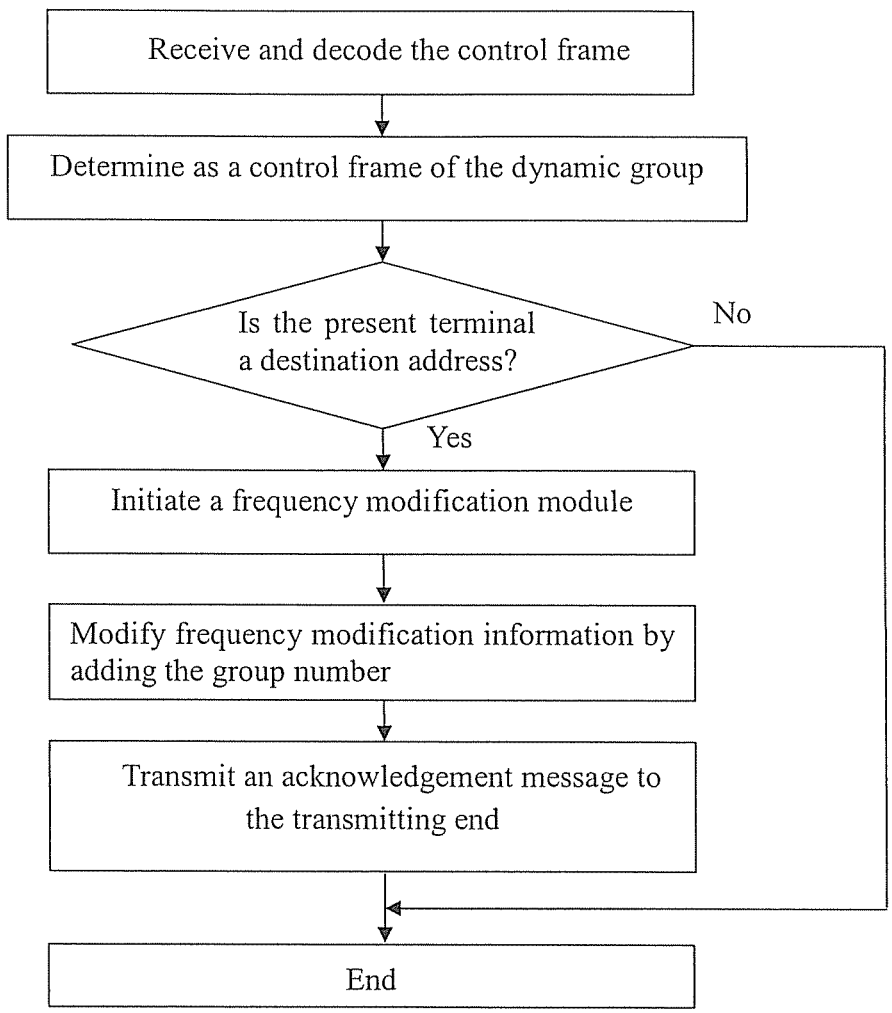
FIG. 7 illustrates a flow chart of operations of implementing a conference call at the receiving end in FIG. 5.

The receiving end (C and D) (as illustrated in FIG. 7):

1. Receives the control frame and decodes the control frame.

2. Determines the control frame as a control frame of a temporary conference call.

3. Determines whether the present terminal is a destination address.

4. Skips the control frame and ends the flow if the receiving end determines that the present terminal is not a destination address.

5. Initiates a frequency modification module if the receiving end determines that the present terminal is a destination address.

6. Modifies the frequency modification information by adding the group number 10005.

7. Sends an acknowledgement message to the transmitting end.

Moreover, the control frame transmitted from the transmitting end to the receiving end may be encrypted with an encryption algorithm embedded therein to thereby better ensure security of the data transmission.

Figure 8:
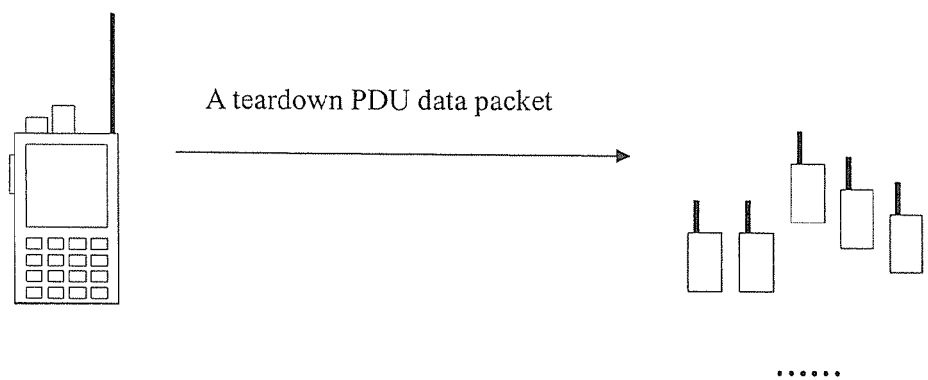
FIG. 8 illustrates a schematic diagram of tearing down a conference call in FIG. 5.

A teardown step may be further included here in order to prevent excessive memory cells of a mobile terminal from being occupied due to frequent use of such a function (as illustrated in FIG. 8).

Figure 9:
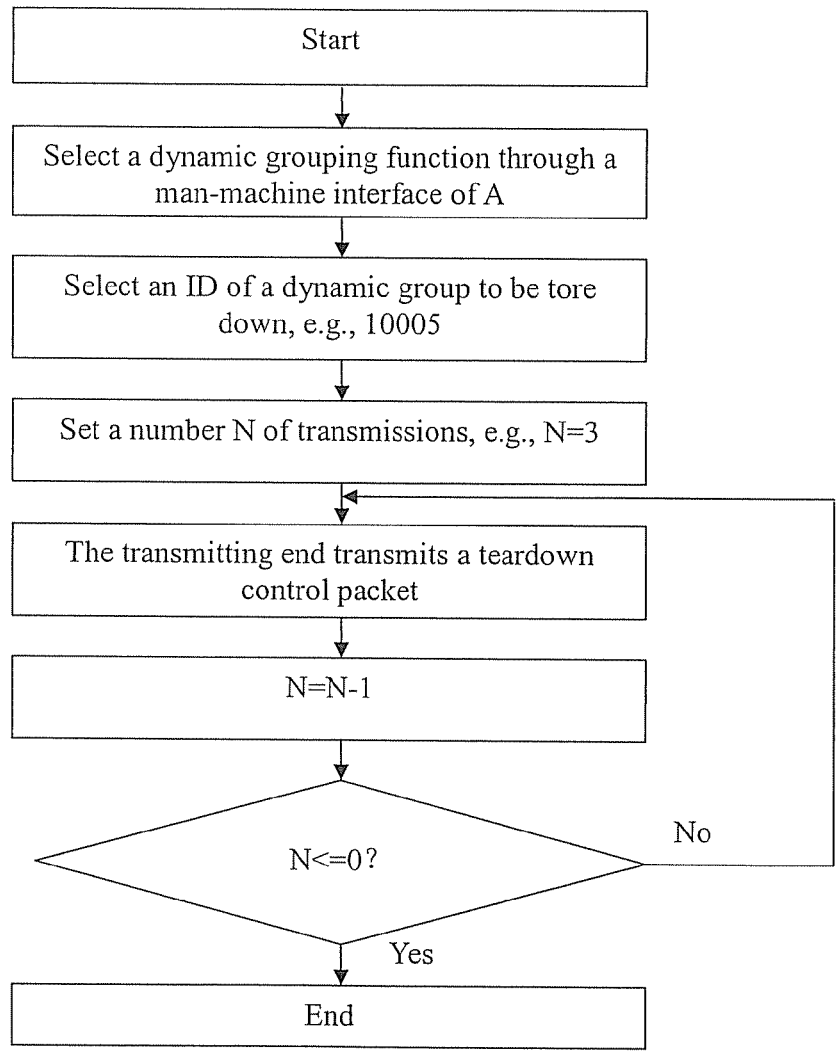
FIG. 9 illustrates a flow chart of tearing down the conference call at the transmitting end in FIG. 8.
Figure 10:
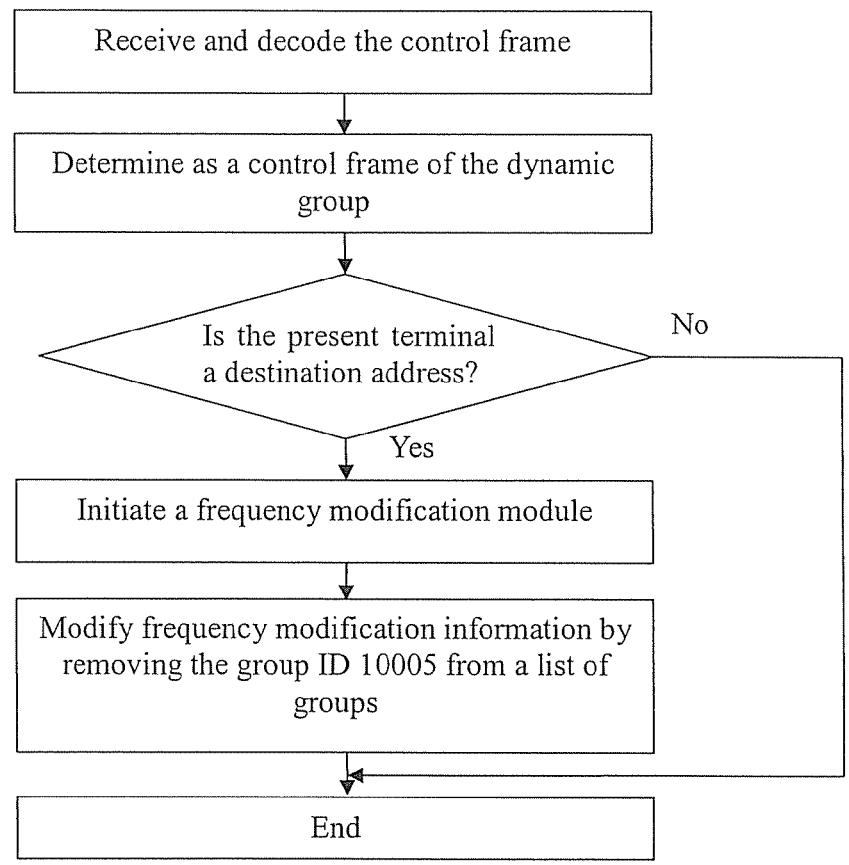
FIG. 10 illustrates a flow chart of tearing down the conference call at the receiving end in FIG. 8.

As illustrated in FIG. 9, the transmitting end transmits a teardown control packet (PDU) for which a number N of transmissions is preset (e.g., N=3) to remove the group number from mobile terminals participating in the conference call. As illustrated in FIG. 10, the receiving end initiates the frequency modification module upon reception of the control packet to remove the group number from a list of groups. If the receiving end fails to receive the teardown control packet due to some reason, the receiving end tears down the group automatically after the group keeps inactive for a period of time.

The foregoing method for implementing a radiophone based conference call may be based upon a specific protocol, e.g., a protocol stack of a radiophone based Digital Mobile Radio (DMR). A general protocol typically provides an extensible interface, which thus can be taken into account in the design of the protocol stack. Dynamic grouping according to the present invention can be implemented via the extensible interface in conjunction with a man-machine interface module. The method for implementing a radiophone based conference call according to the present invention is described in detail below by way of a protocol stack being preset as the DMR protocol.

Figure 11:
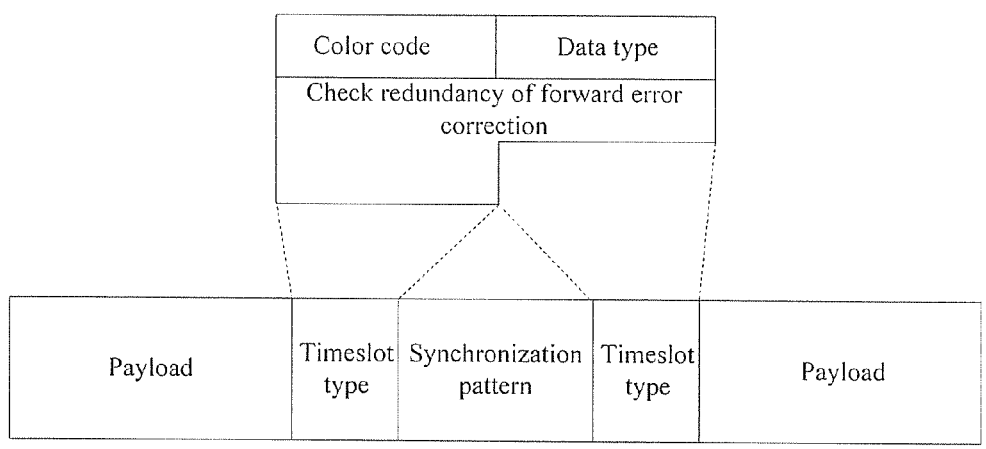
FIG. 11 illustrates a schematic diagram of the DMR data frame format according to the present invention.

As illustrated in FIG. 11, each data packet of a control frame of DMR includes a payload, a timeslot type and a synchronization pattern, where the timeslot type includes a color code, a data type and a check redundancy of forward error correction.

Particularly, the portion of data type includes various possible values listed in the Table below:

TABLE 2

Definition of Data Type

| Information element | Length | Value | Remark |
|---|---|---|---|
| Data Type | 4 | $0000_2$ | PI Header |
| | | $0001_2$ | Voice LC Header |
| | | $0010_2$ | Terminator with LC |
| | | $0011_2$ | CSBK |
| | | $0100_2$ | MBC Header |
| | | $0101_2$ | MBC Continuation |
| | | $0110_2$ | Data Header |
| | | $0111_2$ | Unconfirmed Data Continuation |
| | | $1000_2$ | Confirmed Data Continuation |
| | | $1001_2$ | Idle |
| | | $1010_2$ | Reserved for future use |
| | | $1011_2$ | Reserved for future use |
| | | $1100_2$ | Reserved for future use |
| | | $1101_2$ | Reserved for future use |
| | | $1110_2$ | Reserved for future use |
| | | $1111_2$ | Reserved for future use |

As can be apparent from Table 2, $1010_2$ to $1111_2$ are reserved for extension and in a specific implementation, $1011_2$ may be set for a temporary conference call initiated from a mobile terminal and defined as DG by MS.

A DMR PDU data packet is typically of 80 bits, and for example, a control packet (LC PDU) of control channel of group voice channel user used to initiate a group call is as listed in the Table below:

TABLE 3

Control PDU of Group call

| Information element | Length | Remark |
|---|---|---|
| Message dependent elements | | |
| Protect Flag (PF) | 1 | |
| Reserved | 1 | This bit shall be set to $0_2$ |
| Feature elements | | |
| Full Link Control Opcode (FLCO) | 6 | Shall be set to $000000_2$ |
| Feature set ID (FID) | 8 | Shall be set to $00000000_2$ |
| Service Options | 8 | |
| Reserved | 8 | All bits shall be set to $0_2$ |
| Group address | 24 | |
| Source address | 24 | |

According to the present invention, the extensible interface of the protocol is utilized to design a PDU carrying information for transmission from the transmitting end. The PDU includes three essential elements: the ID of the transmitting end, the group ID of the intended group and the group ID of the temporary conference call.

In addition, the PDU may further include an identity verification code. In a specific implementation, some algorithms may be built in the respective mobile terminals to associate the identity verification code with the addresses of the transmitting end and the receiving end for the purpose of encryption.

A specific PDU as listed in the Table below may be designed with the foregoing three essential address elements and the identity verification code according to the present invention:

TABLE 4

Grouping based upon control packet of mobile terminal

| Information | L | Notes |
|---|---|---|
| Authorization code | 5 | A series of digits for authorization to indicate to receivers that it is authorized to do this |
| Operation | 3 | 000 - To indicate Dynamic Regrouping Setup PDU |
| DG address | 24 | The address of DG to be set up |
| Destination address | 24 | The addresses of radiophones to be grouped, e.g., C and D as above |
| Source address | 24 | The address from which the packet is sent, e.g., A as above |

TABLE 5

Conference call control packet of mobile terminal ID

| Information | L | Notes |
|---|---|---|
| Authorization code | 5 | A series of digits for authorization to indicate to receivers that it is authorized to do this |
| Operation | 3 | 111 - To indicate Dynamic Regrouping Teardown PDU |
| DG address | 24 | The address of DG to be set up |
| Destination address | 24 | The addresses of radiophones to be grouped, e.g., C and D as above |
| Source address | 24 | The address from which the packet is sent, e.g., A as above |

Figure 12:
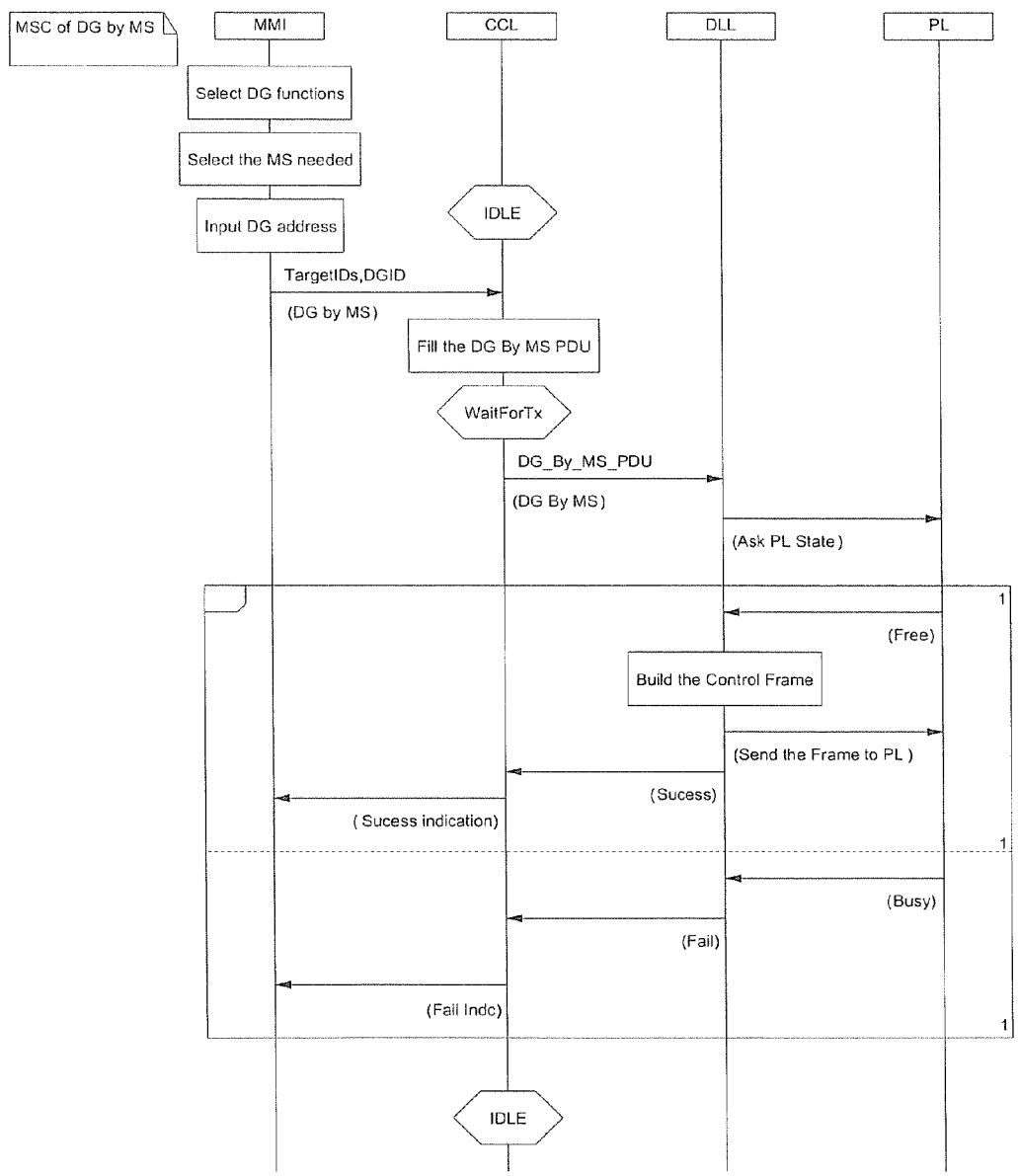
FIG. 12 illustrates a timing diagram of processing of the DMR protocol stack at the receiving end according to the present invention.

The DMR protocol stack is divided into three layers, a Call Control Layer (CCL), a Data Link Layer (DLL) and a Physical Layer (PL). FIG. 12 illustrates a specific process at the transmitting end.

The receiving end selects a dynamic grouping function and mobile terminals needing to participate in a temporary conference call and enters the ID of the temporary conference call, etc., through a man-machine interface. Such address information is transmitted to the call control layer where a PDU data packet of dynamic grouping is configured. The call control layer transmits the resulting PDU data packet to the data link layer. The data link layer then inquires of the state of the physical layer. If the physical layer is busy, the physical layer returns a failure response to the data link layer, which in turns returns the failure response to the call control layer, and the call control layer further returns the failure response to the man-machine interface. If the physical layer is idle, a control frame is generated and transmitted to the physical layer, and a grouping success response is returned to the call control layer, which in turn returns the grouping success response to the man-machine interface.

The process at the receiving end is simple, so detailed description thereof is omitted here.

As can be apparent, the method for implementing a radiophone based call conference according to the present invention may be applied in any mode of private network communication, i.e., the method may be applied in a direct communication mode, a relay mode and a cluster mode, to thereby facilitate both an extended application of private network communication and an increased number of product sale points of a manufacturer for preponderant competitiveness and to save time in an emergency for rapid and convenient dealing with an incident.

The Second Embodiment

Method for Implementing a Radiophone Based Dynamic Grouping

Figure 13:
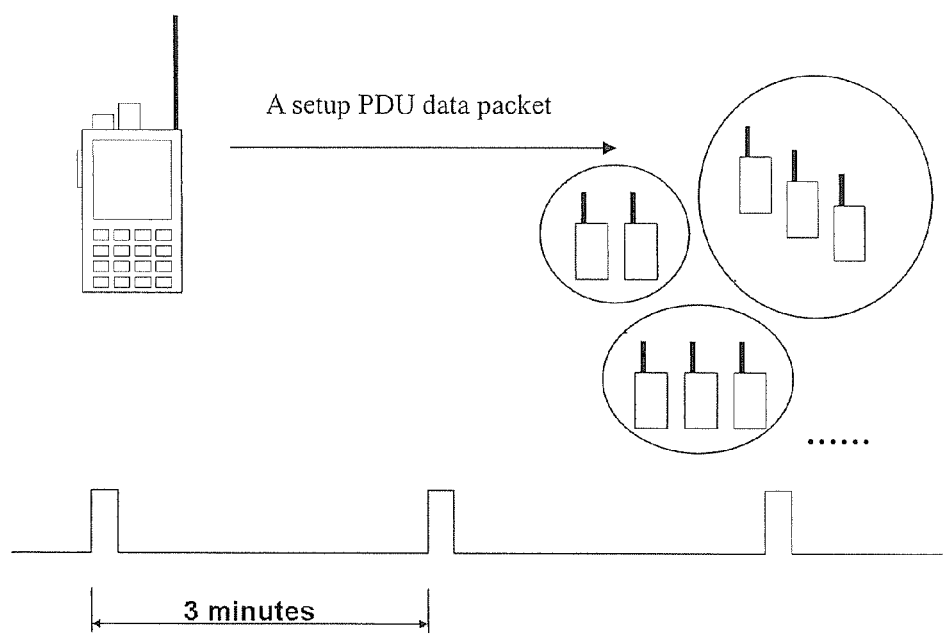
FIG. 13 illustrates a schematic diagram of a method for implementing a radiophone based dynamic grouping according to the present invention.

FIG. 13 illustrates a schematic diagram of the method for implementing a radiophone based dynamic grouping. As illustrated in FIG. 13, there are a plurality of mobile terminals (or mobile stations, which may be specialized radiophones) A, B, C, D, E . . . , divided into two groups, i.e., a maintenance group and a security group, and with specific parameters listed in the Table below:

TABLE 6

Numbers of Terminals

| Label | Address Number | Group Number |
|---|---|---|
| A | 101 | 10001 |
| B | 102 | Maintenance group |
| C | 103 | |
| D | 104 | 10002 |
| E | 105 | Security group |

Figure 14:
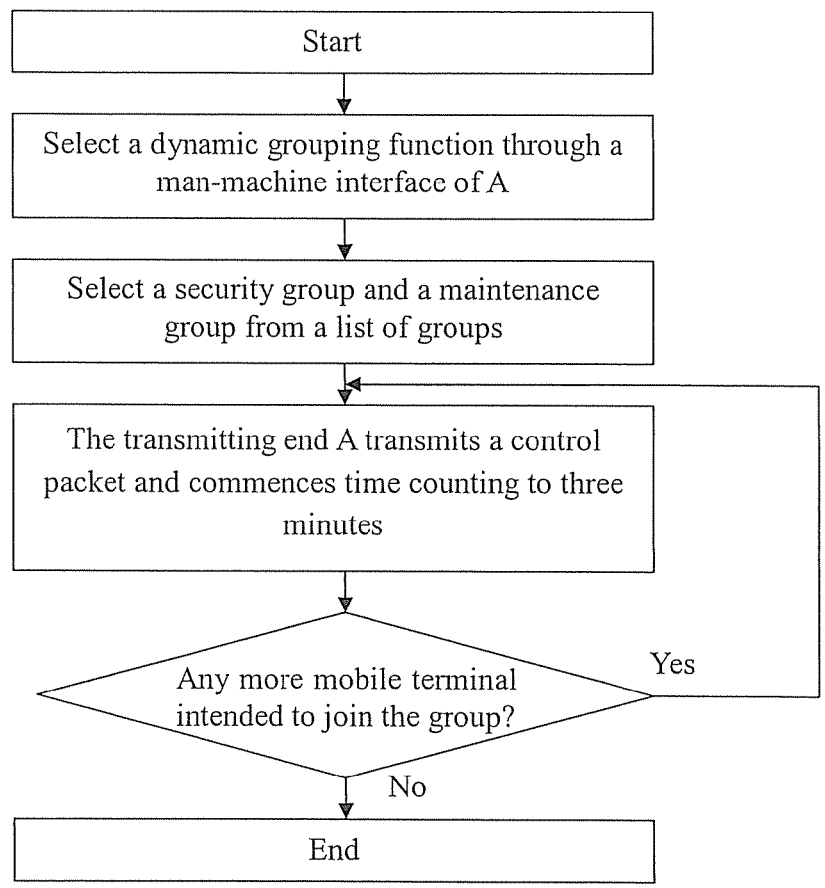
FIG. 14 illustrates a flow chart of operations of implementing dynamic grouping at the transmitting end in FIG. 13.

It is assumed that the mobile terminal A is authorized to group other mobile terminals. The mobile terminal A groups the mobile terminals C and D into a new group dynamically as follows:

The transmitting end (A) (as illustrated in FIG. 14):

1. Selects a dynamic grouping function through a man-machine interface of the mobile terminal A.

2. Selects the type of an intended group (e.g., a security group or a maintenance group). For example, the mobile terminals C and D may be selected by entering directly the numbers of the mobile terminals C and D or selecting the names of the mobile terminals C and D in a phone book of the mobile terminal A.

3. Selects the group ID of a dynamic group. For example, the group ID of the dynamic group may be selected as 10005.

4. Writes the ID of the transmitting end, the group ID of the intended group and the group ID of the dynamic group into a preset protocol stack module through the man-machine interface of the mobile terminal A, and generates a control packet in a coding format and via an extensible interface, wherein the coding format and the extensible interface are inherent to the preset protocol stack module.

5. Transmits the generated control packet in a control frame to the mobile terminals C and D.

6. Transmits the control packet periodically (once per three minutes) in order to enable a subsequent mobile terminal to join the new group.

7. Performs a traditional group call for those mobile terminals which have joined the group.

Figure 15:
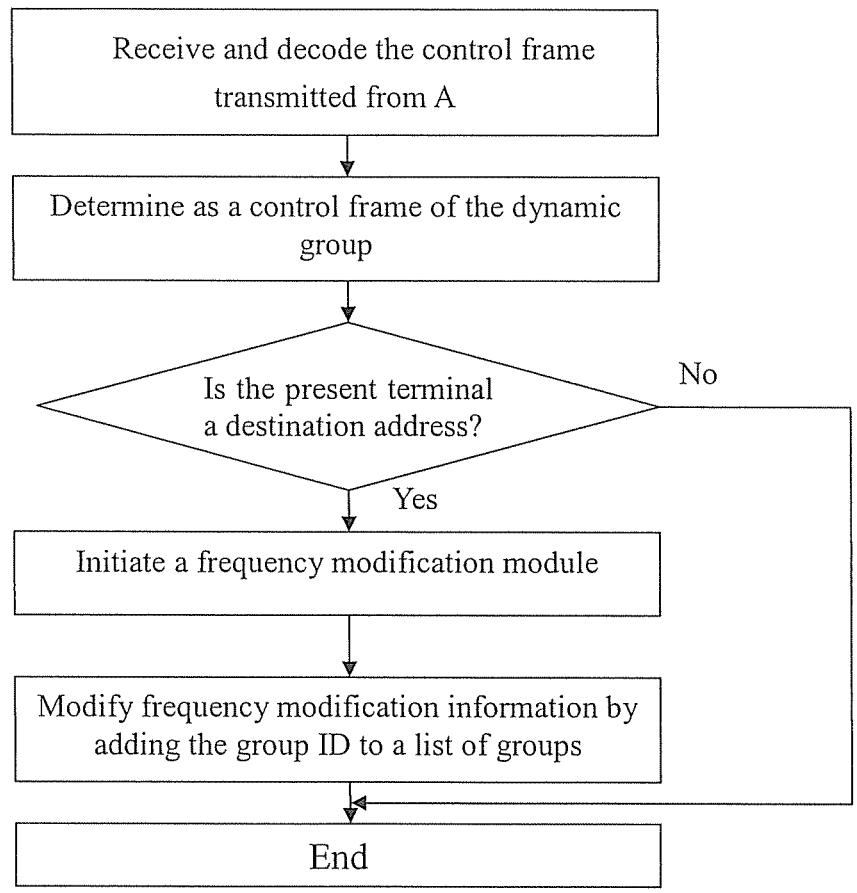
FIG. 15 illustrates a flow chart of operations of implementing dynamic group at the receiving end in FIG. 13.

The receiving end (C and D) (as illustrated in FIG. 15):

1. Receives the control frame and decodes the control frame.

2. Determines the control frame as a control frame of the dynamic group.

3. Determines whether the present terminal is a destination address.

4. If not, skips the control frame and ends the flow.

5. If so, initiates a frequency modification module.

6. Modifies frequency modification information by adding the group number 10003.

Also the control frame transmitted from the transmitting end to the receiving end may be encrypted with an encryption algorithm embedded therein to thereby better ensure security of the data transmission.

After all the intended members have joined, a call may be performed as in a normal group call.

Figure 16:
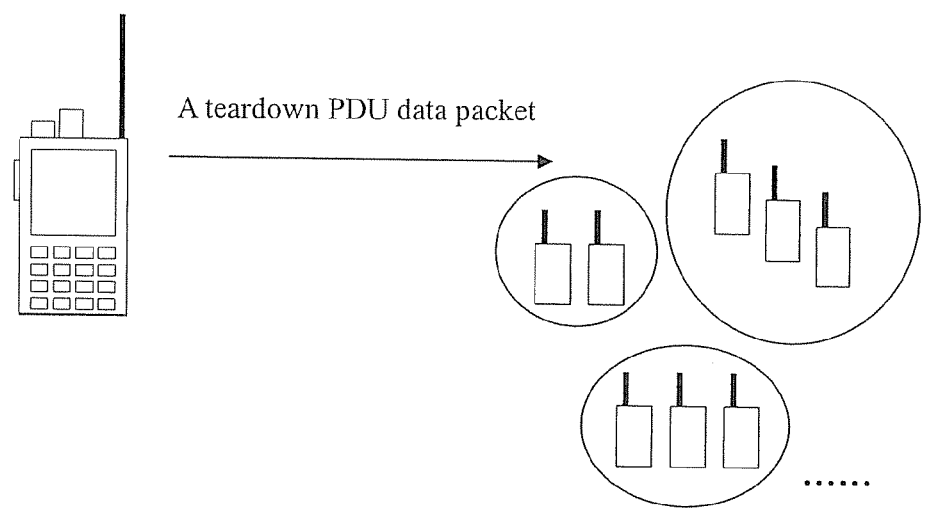
FIG. 16 illustrates a schematic diagram of tearing down the dynamic group in FIG. 13.

The method may further include a teardown step in order to prevent excessive memory cells of a mobile terminal from being occupied due to frequent use of such a function (as illustrated in FIG. 16).

Figure 17:
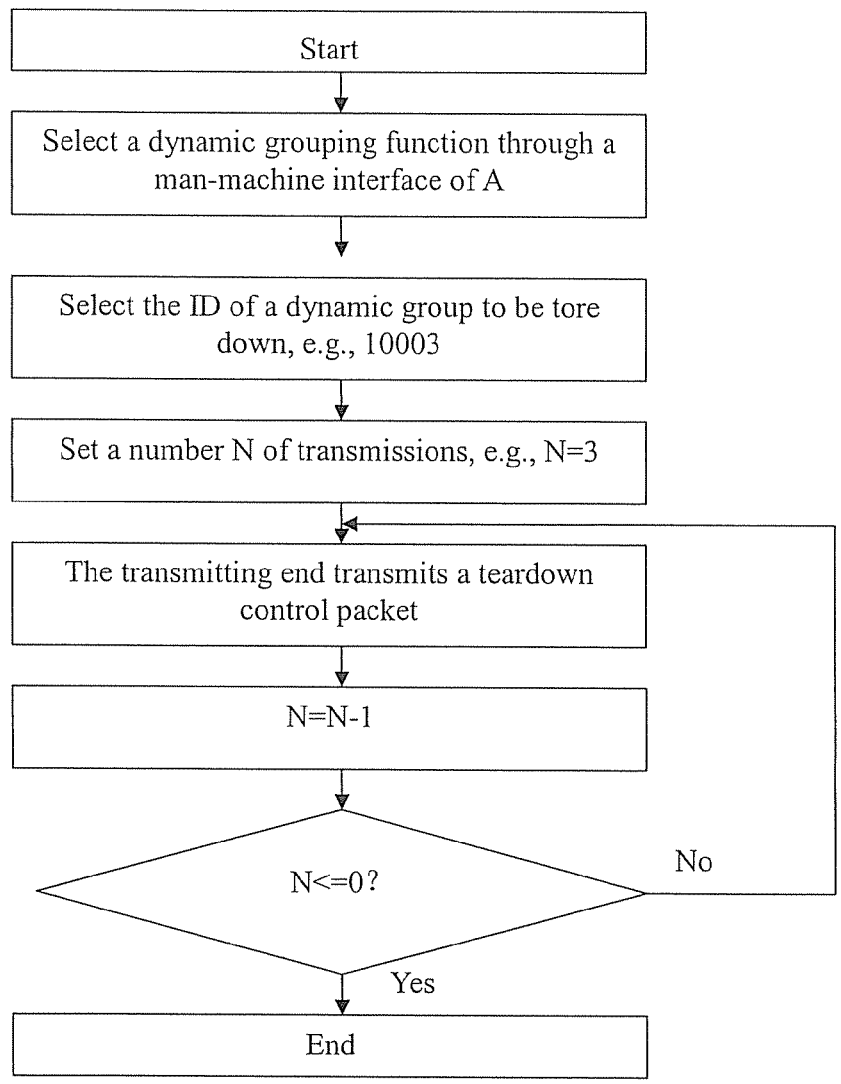
FIG. 17 illustrates a flow chart of tearing down the dynamic group at the transmitting end in FIG. 16.
Figure 18:
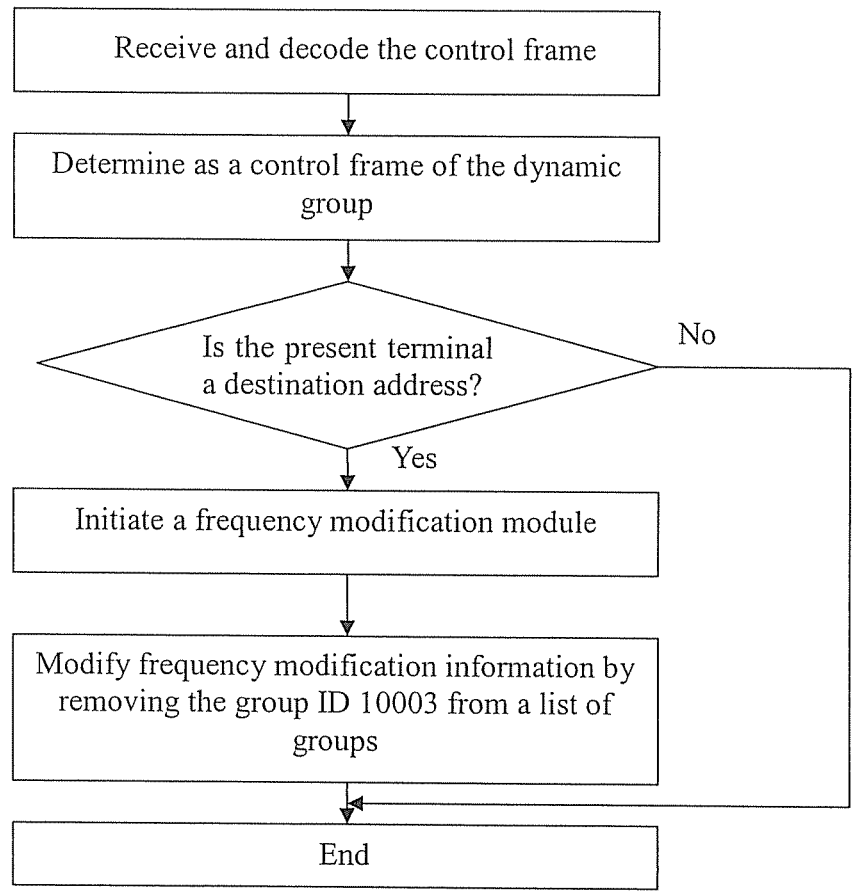
FIG. 18 illustrates a flow chart of tearing down the conference call at the receiving end in FIG. 16.

As illustrated in FIG. 17, the transmitting end transmits a teardown control packet (PDU) for which a number N of transmissions is preset (e.g., N=3) to remove the group number from a mobile terminal participating in the conference call. As illustrated in FIG. 18, the receiving end initiates the frequency modification module to remove the group number from a list of groups upon reception of the control packet.

Here, a teardown control packets may be set in two approaches, one of which is to transmit a PDU of tearing down the group immediately upon completion of using the group, where the PDU is transmitted for three times (at an interval of three minutes) in view of the possibility that a radiophone in the communication range fails to receive the signal due to some reason.

The other approach is to remove automatically at a mobile terminal the group number of the dynamic group which keeps inactive for a predetermined period of time (e.g., 30 minutes) in order to enable the mobile terminal to remove smoothly the group number even if it fails to receive the teardown signal to thereby prevent an excessive memory from being occupied due to many operations.

The relevant setting of a protocol stack is similar to that in the first embodiment, and therefore repeated descriptions thereof are omitted here.

As can be apparent, the method for implementing a radiophone based dynamic grouping according to the present invention may perform a scheduling function variously through mobile stations in a direction communication mode; a user is not required to purchase and use a base station for the scheduling function to thereby realize significant saving of funds; it is convenient and flexible to use and easy to manipulate a mobile station based scheduling system; and time can be saved particularly in an emergency for rapid and convenient dealing with an incident.

According to the method for implementing a radiophone based conference call and the method for implementing a radiophone based dynamic grouping according to the present invention, mobile terminals are utilized as operating ends in a dynamic group, and besides, the present invention can also be compatible with a scheduling mode using PCs in the conventional art while using a mobile terminal as a device transmitting a dynamic group signal and concentrating specific operations on the respective PCs.

The foregoing descriptions are merely illustrative of the preferred embodiments of the present invention but not intended to limit the present invention thereto. Those skilled in the art shall appreciate that various modifications and variations may be made to the present invention. Any modifications, substitutions, adaptations, etc., that can be made without departing from the spirit and scope of the present invention shall be encompassed in the scope of the present invention as defined in the appended claims.

What is claimed is:

1. A method for implementing a radiophone based conference call, when a conference call is required for one or more radiophones, the method comprising the steps at a radiophone serving as a transmitting end of a group:
   a. selecting a group ID of an intended group and a group ID of an intended temporary conference call through a man-machine interface of the radiophone serving as the transmitting end;
   b. writing an ID of the transmitting end, the group ID of the intended group and the group ID of the temporary conference call into a preset protocol stack module, and generating a control packet used to set up the temporary conference call in a coding format and via an extensible interface, the coding format and the extensible interface being inherent to the preset protocol stack module; and
   c. transmitting the control packet for setting up the temporary conference call to a corresponding radiophone serving as a receiving end in a control frame directly; and the method comprising the steps at one or more radiophones serving as receiving ends of the intended group:
   d. decoding the control frame transmitted from the radiophone serving as the transmitting end;
   e. determining whether the one or more radiophones serving as the receiving ends are subjects to an operation from the control frame, and if it is determined that the one or more radiophones serving as the receiving ends are subjects to an operation from the control frame, going to step f; otherwise, skipping the control frame and ending; and
   f. initiating a frequency modification module to modify frequency modification information by adding the group ID of the temporary conference call, so that the temporary conference call between the radiophone serving as the transmitting end and the one or more radiophone serving as the receiving ends is set up.

2. The method for implementing a radiophone based conference call according to claim 1, wherein after the step c, the method further comprises:
   retransmitting the control frame to the corresponding radiophone serving as the receiving end if the radiophone serving as the transmitting end fails to receive a response returned from the radiophone serving as the receiving end in a preset period of time; or
   transmitting the control frame to a next radiophone serving as the receiving end if the radiophone serving as the transmitting end receives a response returned from the corresponding radiophone serving as the receiving end in a preset period of time or if the number of retransmissions exceeds a preset number of retransmissions.

3. The method for implementing a radiophone based conference call according to claim 1, further comprising:
   displaying a condition of setting up the temporary conference call on the man-machine interface of the radiophone serving as the transmitting end, determining whether all users have been included in a new group of the temporary conference call; and if all users have been included in the new group of the temporary conference call, the new group among the radiophones is set up successfully; otherwise, transmitting the control frame to a user who has not been included in the new group of the temporary conference call, and returning to the step c.

4. The method for implementing a radiophone based conference call according to claim 1, wherein before the step e, the method further comprises:
   determining whether the control frame is a control frame of the temporary conference call, and if the control frame is a control frame of the temporary conference call, going to the step e.

5. The method for implementing a radiophone based conference call according to claim 1, further comprises:
   transmitting, by the radiophone serving as the transmitting end, a teardown data packet to respective members of an intended group to remove the group ID of the temporary conference call from the radiophones participating in the temporary conference call; and
   tearing down a new group automatically by one of the members if the member fails to receive the teardown data packet and the new group of the temporary conference call keeps inactive for a preset period of time.

6. A method for implementing a radiophone based dynamic grouping, when the dynamic grouping is to be performed on one or more radiophones belonging to different groups, the method comprising the steps at a radiophone serving as a transmitting end of an intended group:
- A. selecting a type and a group ID of the intended group and a group ID of a dynamic group through a man-machine interface of the transmitting end;
- B. writing an ID of the radiophone serving as the transmitting end, the group ID of the intended group and the group ID of the dynamic group into a preset protocol stack module, and
generating a control packet used to set up the intended group in a coding format and via an extensible interface, the coding format and the extensible interface being inherent to the preset protocol stack module; and
- C. transmitting the control packet for setting up the intended group to a corresponding radiophone serving as a receiving end in a control frame; and
the method comprising the steps at one or more radiophones serving as receiving ends of the intended group:
- D. decoding the control frame transmitted from the radiophone serving as the transmitting end;
- E. determining whether the one or more radiophones serving as the receiving ends are subject to an operation from the control frame, and if it is determined that the one or more radiophones serving as the receiving ends are subject to an operation from the control frame, going to the step F; otherwise, skipping the control frame and ending; and
- F. initiating a frequency modification module to modify frequency modification information by adding the group ID of the dynamic group, so that the intended group including the radiophone serving as the transmitting end and the one or more radiophones serving as the receiving ends is set up.

7. The method for implementing a radiophone based dynamic grouping according to claim 6, wherein after the step C, the method further comprises:
transmitting, by the radiophone serving as the transmitting end, the control frame periodically to join a subsequent radiophone into the dynamic group.

8. The method for implementing a radiophone based dynamic grouping according to claim 6, wherein before the step E, the method further comprises:
determining whether the control frame is a control frame of the dynamic group, and if it is determined that the control frame is a control frame of the dynamic group, going to the step E.

9. The method for implementing a radiophone based dynamic grouping according to claim 6, further comprises:
transmitting, by the radiophone serving as the transmitting end, a teardown data packet to respective members of the intended group at an interval of a predetermined number of minutes for a preset number of transmissions to remove the group ID of the dynamic group from the radiophones in the dynamic group; or
tearing down automatically by one of the radiophones the dynamic group if the radiophone fails to receive the teardown data packet and the dynamic group keeps inactive for a preset period of time.

10. The method for implementing a radiophone based dynamic grouping according to claim 6, further comprising:
setting an identity verification code, and encrypting the control frame.

11. The method for implementing a radiophone based conference call according to claim 2, further comprising:
displaying a condition of setting up the temporary conference call on the man-machine interface of the radiophone serving as the transmitting end, determining whether all users have been included in the new group of the temporary conference call; and if all users have been included in the new group of the temporary conference call, new group among the radiophones is set up successfully; otherwise, transmitting the control frame to a user who has not been included in the new group of the temporary conference call, and returning to the step c.

12. The method for implementing a radiophone based dynamic grouping according to claim 7, wherein before the step E, the method further comprise:
determining whether the control frame is a control frame of the dynamic group, and if it is determined that the control frame is a control frame of the dynamic group, going to the step E.

* * * * *